Nov. 1, 1960  D. M. JENSEN  2,958,559
AUXILIARY VISOR
Filed March 19, 1958
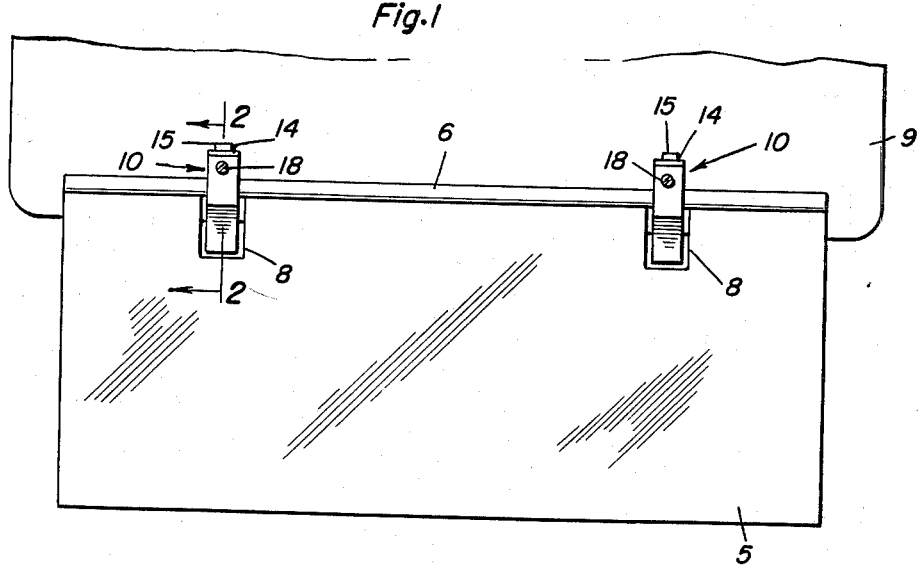
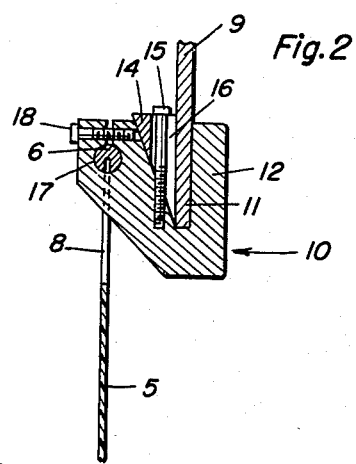
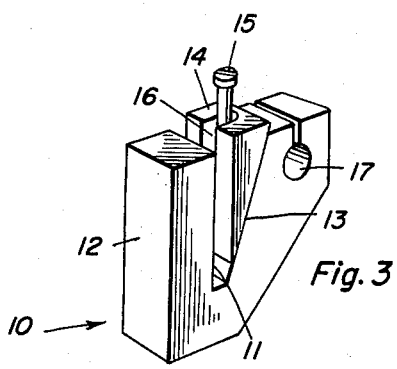
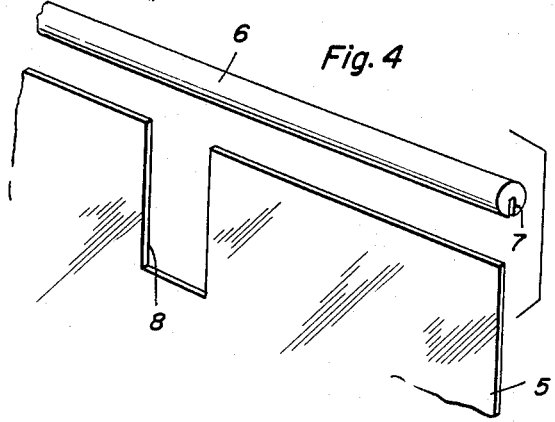
Dahlen M. Jensen
INVENTOR.

United States Patent Office 2,958,559
Patented Nov. 1, 1960

2,958,559
AUXILIARY VISOR

Dahlen M. Jensen, 11978 Flagler, San Jose, Calif.

Filed Mar. 19, 1958, Ser. No. 722,413

2 Claims. (Cl. 296—97)

The present invention relates to new and useful improvements in auxiliary visors particularly for motor vehicles and has for its primary object to provide, in a manner as hereinafter set forth, a device of this character which will effectively eliminate glare without obstructing the vision.

Another very important object of the invention is to provide novel means for mounting the auxiliary visor for swinging adjustment on the standard opaque visor with which most motor vehicles are equipped.

Other objects of the invention are to provide an auxiliary visor of the aforementioned character which will be comparatively simple in construction, strong, durable, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of an auxiliary visor constructed in accordance with the present invention, showing the same mounted on a standard visor;

Figure 2 is an enlarged view in vertical transverse section, taken substantially on the line 2—2 of Figure 1;

Figure 3 is a perspective view of one of the mounting clamps; and

Figure 4 is a fragmentary view in perspective of a portion of the panel and its mounting rod, showing the parts separated.

Referring now to the drawing in detail, it will be seen that the embodiment of the invention which has been illustrated comprises an elongated, rectangular, suitably tinted, substantially transparent or translucent plastic plate, sheet or panel 5. The panel 5, which may also be of any desired dimensions, has fixed on one of its longitudinal edges of rod 6 of a clear plastic. The rod 6 has formed therein a longitudinal groove 7 in which the panel 5 is fixed. The longitudinal marginal portion of the panel 5 on which the rod 6 is mounted has formed therein, at spaced points, cut-outs or openings 8 the purpose of which will be presently set forth.

The panel 5 is adapted to be mounted for swinging adjustment in a vertical plane on the lower marginal portion of a conventional opaque visor 9. Toward this end, clamps 10 of suitable material are provided. The clamps 10 include blocks having formed therein substantially triangular recesses 11 for the reception of the standard visor 9, said recesses defining stationary jaws 12 engageable with one side of said visor 9. The recesses 11 further provide faces 13 which are inclined relatively to the stationary jaws 12. Substantially wedge shaped or triangular jaws 14 are slidable on the faces 13 and engageable with the other side of the standard visor 9. The slidable jaws 14 are adjusted and tightened through the medium of self-tapping screws 15 which are threaded into the bodies of the clamps 10. The screws 15 are operable in grooves or channels 16 which are provided therefor in the slidable jaws 14.

The clamps 10 further include, in one end portion, keyhole slots 17 in which the rod 6 is engaged and frictionally retained. The cut-outs or openings 8 in the panel 5 accommodate the clamps 10. Screws 18 bridge the keyhole slots 17 above the rod 6 and are threadedly mounted in the clamps 10 for opening or closing said keyhole slots for adjusting the frictional grip of said clamps on said rod.

It is thought that the use of the visor will be readily apparent from a consideration of the foregoing. Briefly, the clamps 10 are slipped upwardly on the free or lower longitudinal marginal portion of the standard visor 9, the slots 11 receiving said visor. The visor 9 is engaged between the jaws 12 and 14 of the clamps 10. The screws 15 are then tightened for causing the visor 9 to be clamped between the jaws 12 and 14 in an obvious manner. Thus, the panel 5 is mounted for vertical swinging movement on the visor 9. The clamps 10 grip the rod 6 for frictionally securing the panel 5 in inoperative position over the standard visor 9 or in any desired operative position. The frictional grip of the clamps 10 on the rod 6 may be regulated as desired through the medium of the screws 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention as claimed.

What is claimed as new is as follows:

1. An auxiliary vehicle visor comprising a generally rectangular panel having spaced cut-outs in one of its longitudinal edges, a rod on the panel bridging the cut-outs and having a longitudinal groove therein fixedly receiving said one longitudinal edge of said panel, and clamps secured for rotary adjustment on the rod in the cut-outs for mounting the panel on a standard visor.

2. Means for mounting for swinging adjustment on a standard vehicle visor an auxiliary visor including a rectangular panel having spaced cut-outs in one of its longitudinal edges, said means comprising clamps including blocks having generally triangular recesses therein for the reception of the standard visor, generally wedge-shaped jaws slidable on one of the walls of said recesses and cooperable with the opposite walls thereof for receiving and frictionally securing the standard visor therebetween, said jaws having longitudinal channels therein, screws operable in the channels and threadedly mounted on said one wall of the recesses for closing the jaws on the standard visor, said blocks further having keyhole slots therein, a rod mounted for rotary adjustment in the keyhole slots, said rod adapted to bridge the cut-outs in the panel and having a longitudinal groove therein for fixedly receiving said one longitudinal edge of said panel, and screws threadedly mounted in the blocks for contracting the keyhole slots for frictionally securing the rod in adjusted position.

References Cited in the file of this patent

UNITED STATES PATENTS

| | | |
|---|---|---|
| 369,136 | Stuart | Aug. 30, 1887 |
| 797,943 | Crawford | Aug. 22, 1905 |
| 1,468,110 | Howe | Sept. 18, 1923 |
| 1,958,934 | Williams | May 15, 1934 |
| 2,020,585 | Stansberry | Nov. 12, 1935 |
| 2,337,805 | Erickson | Dec. 28, 1943 |
| 2,382,911 | Pringle | Aug. 14, 1945 |
| 2,670,732 | Nelson | Mar. 2, 1954 |
| 2,757,955 | Chester | Aug. 7, 1956 |